US008812061B2

(12) United States Patent
Springs et al.

(10) Patent No.: US 8,812,061 B2
(45) Date of Patent: Aug. 19, 2014

(54) BATTERY BACKUP SYSTEMS AND METHODS FOR VEHICLE PHONE SYSTEMS

(75) Inventors: Michael Springs, Holland, MI (US); Jaeyoung Yu, Holland, MI (US); Prabin Pradhan, Kalamazoo, MI (US); Todd Sanders, Zeeland, MI (US); Justin G. Voogt, Grandville, MI (US)

(73) Assignee: Johnson Controls Technology Company, Holland, MI (US)

( * ) Notice: Subject to any disclaimer, the term of this patent is extended or adjusted under 35 U.S.C. 154(b) by 219 days.

(21) Appl. No.: 12/965,729

(22) Filed: Dec. 10, 2010

(65) Prior Publication Data

US 2012/0149323 A1  Jun. 14, 2012

(51) Int. Cl.
*H04B 1/38* (2006.01)
*B60R 25/40* (2013.01)
*G08G 1/00* (2006.01)

(52) U.S. Cl.
CPC ......... *B60R 25/403* (2013.01); *B60R 2325/205* (2013.01); *G08G 1/205* (2013.01)
USPC ........... 455/572; 455/404.1; 340/438; 701/45

(58) Field of Classification Search
CPC .............................. H04W 52/00; H04W 52/02
USPC .......... 455/572, 404.1; 340/438, 988; 701/45; 307/10.1
See application file for complete search history.

(56) References Cited

U.S. PATENT DOCUMENTS

| | | | |
|---|---|---|---|
| 5,191,500 A * | 3/1993 | Hatano et al. .................... 361/64 |
| 5,487,956 A * | 1/1996 | Bromley et al. ............... 320/163 |
| 6,330,463 B1 * | 12/2001 | Hedrich ......................... 455/573 |
| 6,512,466 B2 * | 1/2003 | Flick ............................... 340/989 |
| 6,591,176 B1 * | 7/2003 | Perry et al. ....................... 701/45 |
| 7,170,193 B2 * | 1/2007 | Ferre ............................ 307/10.1 |
| 7,257,388 B2 * | 8/2007 | Bayne ............................ 455/406 |
| 7,260,457 B2 * | 8/2007 | Ma et al. ......................... 701/36 |
| 7,366,495 B1 * | 4/2008 | Magnotta et al. ............. 455/406 |
| 7,747,241 B1 * | 6/2010 | Magnotta et al. ............. 455/406 |
| 7,812,714 B2 * | 10/2010 | Sakai ............................ 340/438 |
| 8,160,656 B2 * | 4/2012 | Van Bosch et al. ........... 455/574 |
| 2002/0008644 A1 * | 1/2002 | Flick ............................ 340/988 |
| 2002/0098859 A1 * | 7/2002 | Murata ......................... 455/522 |
| 2003/0050039 A1 * | 3/2003 | Baba et al. .................... 455/404 |
| 2005/0125117 A1 * | 6/2005 | Breed ............................ 701/29 |
| 2007/0018797 A1 * | 1/2007 | Chen et al. ................. 340/425.5 |
| 2008/0122592 A1 * | 5/2008 | Shimizu .................... 340/425.5 |
| 2009/0209225 A1 * | 8/2009 | Sakai et al. .................. 455/404.1 |
| 2010/0227582 A1 * | 9/2010 | Berry et al. ................. 455/404.1 |
| 2011/0125363 A1 * | 5/2011 | Blumer et al. ................... 701/33 |

OTHER PUBLICATIONS

International Search Report and Written Opinion of the International Searching Authority dated Mar. 12, 2012 as received in PCT/US2011/062891, 11 pages.

* cited by examiner

*Primary Examiner* — Charles Shedrick
(74) *Attorney, Agent, or Firm* — Foley & Lardner LLP (57) ABSTRACT

A battery backup system for use with vehicle telematics electronics includes a phone module configured for operation by the vehicle telematics electronics. The system further includes a battery module configured to provide power to the phone module and a circuit configured to determine that backup power is needed. The circuit causes the battery module to provide the backup power to the phone module for completing a transmission via the phone module. The battery module can provide the backup power to the phone module without providing operating power to the vehicle telematics electronics.

20 Claims, 6 Drawing Sheets

BATTERY BACKUP SYSTEMS AND METHODS FOR VEHICLE PHONE SYSTEMS

BACKGROUND

The present disclosure generally relates to the field of vehicle telematics. The present disclosure relates more specifically to battery backup systems and methods for vehicle phone systems.

Some vehicles include phones that can make emergency calls in the event of a collision or other emergency. Electronics for such phones have conventionally been powered by the vehicle's primary power system (e.g., the vehicle's primary fourteen volt battery and alternator, a twelve volt battery, etc.). If a collision or other emergency cuts power between the vehicle's primary power system and the phone electronics, conventional telematics systems may not be able to complete an emergency call. Some vehicles include battery backup systems for the entirety of the vehicle's telematics stack (e.g., display electronics, connectivity electronics, vehicle information electronics, vehicle diagnostics, media system, heating, ventilation and air conditioning system (HVAC), etc.). It is challenging and difficult to design robust and cost efficient battery backup systems for vehicle telematics systems.

SUMMARY

One embodiment of the invention relates to a battery backup system for use with vehicle telematics electronics. The battery backup system includes a phone module configured for operation by the vehicle telematics electronics. The battery backup system further includes a battery module configured to provide power to the phone module. The battery backup system also includes a circuit configured to determine that backup power is needed and to cause the battery module to provide the backup power to the phone module for completing a transmission via the phone module. The circuit can cause the backup power to be provided to the phone module without providing operating power to the vehicle telematics electronics. The battery module may provide a low voltage output such that the phone module can be operated with the battery module but the vehicle telematics system cannot be operated with the battery module. The phone module may include a processing circuit configured to initiate the transmission and to complete the transmission using the backup power received from the battery module. The phone module may be configured to initiate the transmission without user input or user action. The transmission initiated and completed by the phone module may include one or more of an emergency call, an emergency text message, an emergency data message, or an emergency e-mail. The circuit of the battery backup system may be configured to monitor power available on the vehicle's primary power system and to determine that backup power is needed in response to a loss of power available on the vehicle's primary power system. In the same or in another embodiment, the circuit may be configured to monitor a signal from at least one of the telematics electronics, a vehicle data bus, or an airbag system and to determine that the backup power is needed in response to the monitored signal. The monitored signal may be at least one of a collision detect signal, an airbag deployment signal, or an automatic collision notification signal. Monitoring the signal may include detecting whether the signal is no longer present. In some embodiments, the battery module may have a terminal voltage of less than half that of a terminal voltage of the vehicle power system. In the same or other embodiments, the battery module has a terminal voltage that is lower than that required to power-up and operate the telematics electronics.

Another embodiment of the invention relates to a method for providing battery backup power to a phone module in a vehicle having telematics electronics that are normally powered by a vehicle power system. The method includes determining that backup power is needed at a backup circuit. The method further includes using the backup circuit to cause a battery backup module to provide backup power to the phone module for a completing a transmission via the phone module. The backup power may be provided to the phone module without providing operating power to the vehicle telematics electronics.

Another embodiment of the invention relates to a battery backup system for use with vehicle telematics electronics. The battery backup system includes a phone module configured for operation by the vehicle telematics electronics. The battery backup system also includes a battery module configured to provide power to the phone module. The battery backup system further includes means for determining that backup power is needed and means for causing the battery module to provide backup power to the phone module in response to the determination that backup power is needed. The backup power for completing a transmission via the phone module is provided without providing operating power to the vehicle telematics electronics. The battery module may provide a low voltage output such that the phone module can be operated with the battery module but the vehicle telematics system cannot be operated with the battery module. The phone module may include a processing circuit configured to initiate the transmission and to complete the transmission using the backup power received from the battery module. The phone module may be configured to initiate the transmission without user input or user action.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 5A illustrates the right side of the circuit diagram of FIGS. 5A-5C;

FIG. 5B illustrates the left side of the circuit diagram of FIGS. 5A-5C; and

FIG. 5C illustrates a battery backup processing circuit for connection to a plurality of inputs and outputs of the circuit diagram portions shown in FIGS. 5A and 5B.

DETAILED DESCRIPTION OF THE EXEMPLARY EMBODIMENTS

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the Figures, systems and methods are shown for powering only a vehicle phone module with battery backup power in the event power from the vehicle's primary power system is unavailable. The battery backup system for the vehicle phone module can advantageously be small, low voltage, or relatively inexpensive. The battery backup system for the vehicle phone module can advantageously allow for a transmission (e.g., automated emergency call, data message, text message, etc.) to be sent from the vehicle in the event of a collision or other vehicle event (e.g., mechanical failure, electrical failure, etc.).

Figure 1:
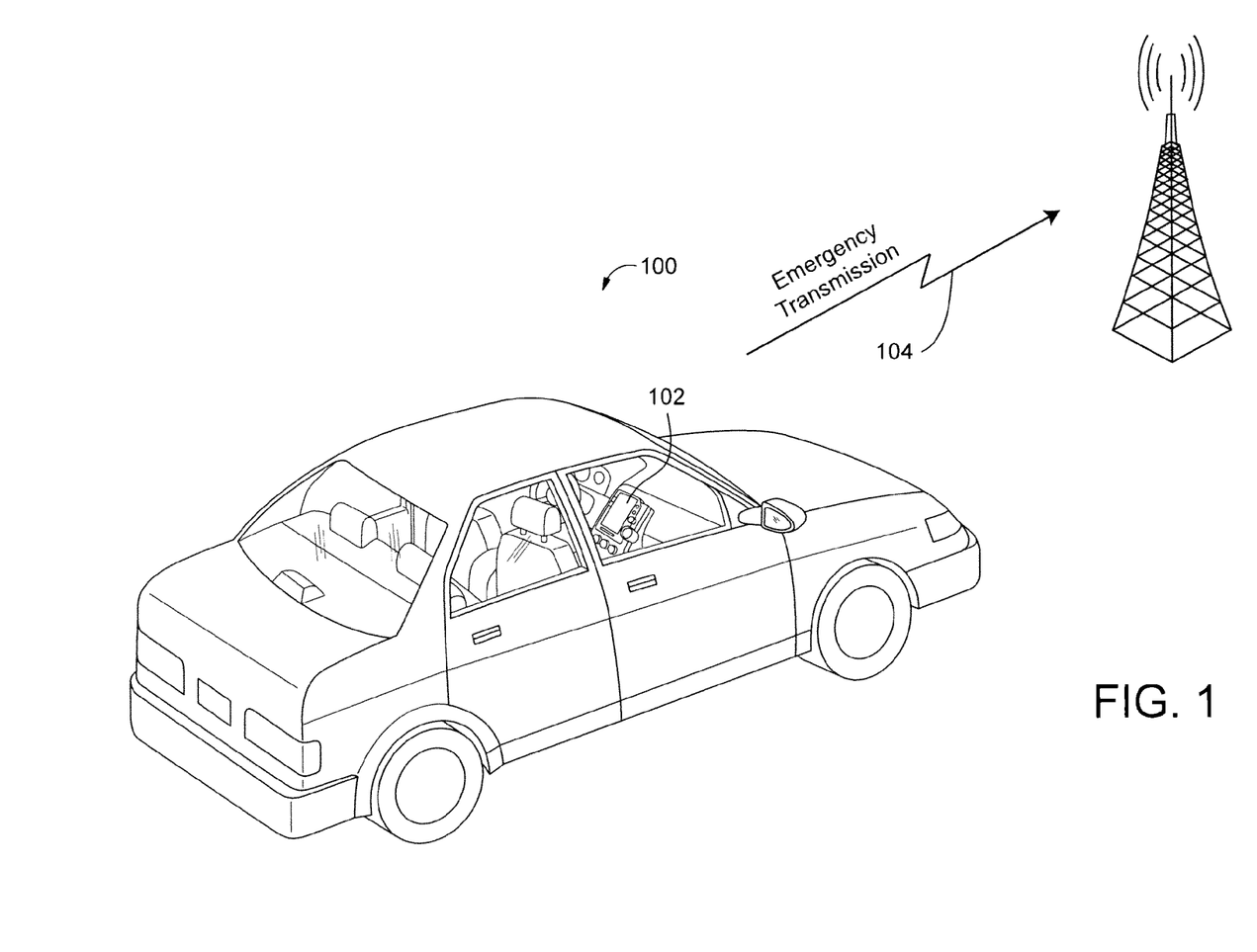
FIG. 1 is a perspective view of a vehicle that includes a number of vehicle systems, including a vehicle telematics system, according to an exemplary embodiment.

Referring now to FIG. 1, a vehicle 100 includes a number of subsystems for user convenience and entertainment. Modern vehicles include subsystems that are often considered telematics electronics. Telematics electronics, for example, can include electronics for conducting data communications with remote sources or local mobile devices (e.g., portable navigation devices (PNDs), personal digital assistants (PDAs), mobile phones, etc.). Telematics electronics can also or alternatively include positioning technology (e.g., having a GNSS, having a GPS receiver, having a navigation database, having a driving assistance system, etc.), a media system (e.g., for digital playback from digital audio sources, for playback from a radio source, etc.), controls for vehicle comfort settings, other user-interactive information technology features of a vehicle, or other communications subsystems of a vehicle. In the illustration of FIG. 1, telematics electronics 102 include a user interface having an electronic display (e.g., for display of maps, phone information, commerce information, radio information, media information, etc.) and user controls such as pushbuttons and dials. Telematics electronics 102 may also include jacks, terminals, or other interfaces for communicating with media players or other devices in the vehicle. Telematics electronics 102 may yet further include a microphone for receiving user commands or feedback. In some cases telematics electronics 102 can include many of the same features included in personal computers (e.g., an operating system (e.g., Windows CE, QNX, VxWorks, Embedded Linux, etc.) hard disk storage, flash memory storage, multi-tasking processors, graphical user interface (GUI)-based display systems, touch screens, or other computer-like hardware or software).

When vehicle 100 experiences a collision or another event that may indicate an emergency (e.g., airbag deployment), a phone module of vehicle 100 and associated with telematics electronics 102 may be configured to initiate an emergency transmission 104. Emergency transmission 104 may include vehicle position information, an emergency code, or other information that may be helpful to a receiving source. Emergency transmission 104 may be a cellular phone call (e.g., to 911), a text message, or another type of data communication. In the example shown in FIG. 1, a phone module of telematics electronics 102 transmits emergency transmission 104 to a cellular tower where the data of transmission 104 is then routed to a telephone company exchange and eventually to the intended recipient (e.g., a local 911 call center).

In varying exemplary embodiments, vehicle 100 includes a battery backup system for the phone module in vehicle 100 that is configured to initiate emergency transmission 104. In the event that power from the vehicle's primary power system is unavailable or might be unavailable, the battery backup system can provide power to the phone module that is sufficient to allow the phone module to make the desired emergency transmission 104. The battery backup system can provide sufficient backup power for the phone module's transmission 104 without powering up or maintaining power to the entirety of telematics electronics 102 (i.e., the computer-like collection of hardware and software).

Figures 2A, 2B:
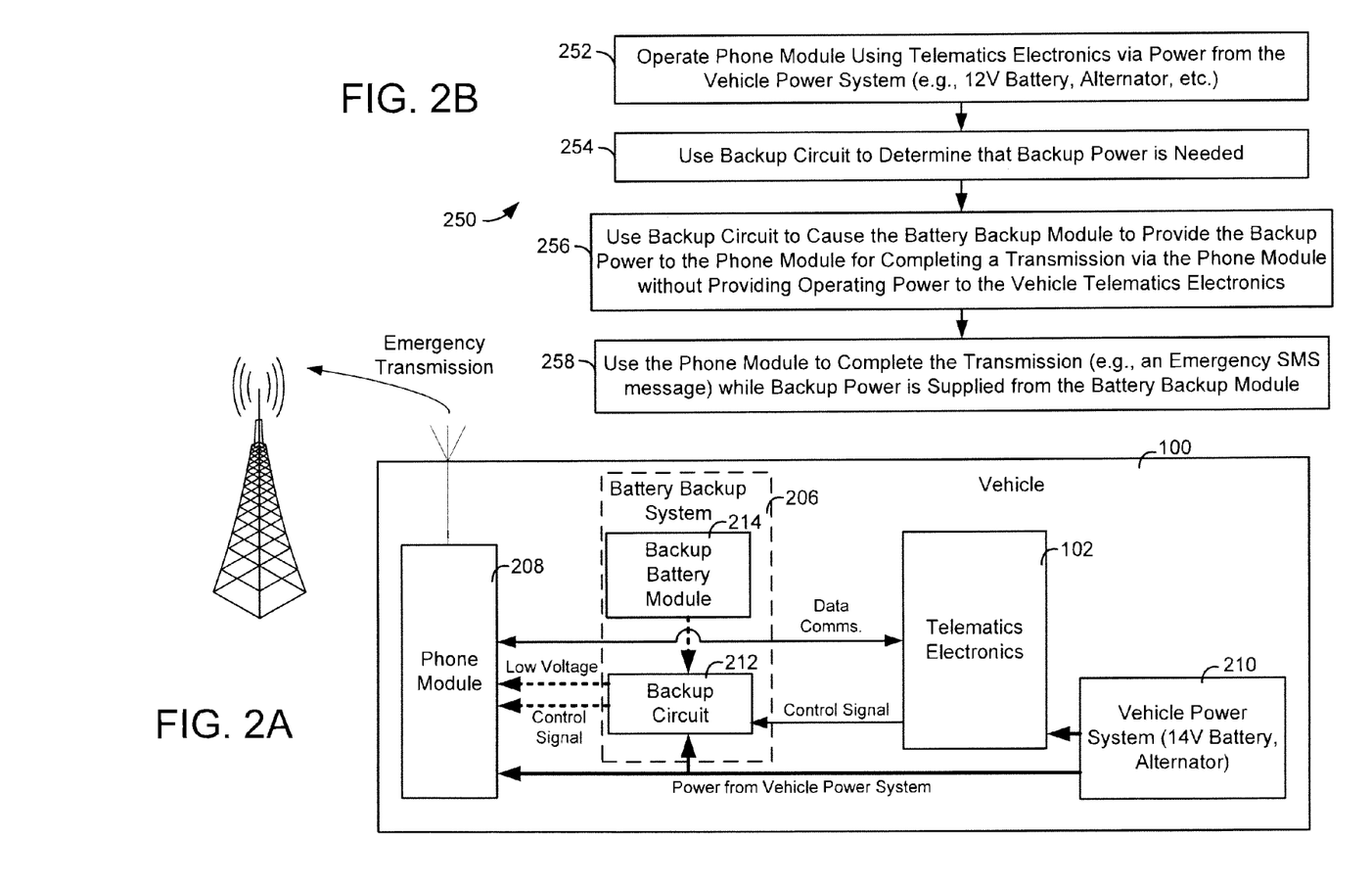
FIG. 2A is a block diagram of a vehicle having telematics electronics and a battery backup system for a phone module, according to an exemplary embodiment.
FIG. 2B is a flow chart of a process for providing battery backup power to a phone module in a vehicle having telematics electronics that are normally powered by a vehicle power system, according to an exemplary embodiment.

Referring now to FIG. 2A, a block diagram of vehicle 100 having telematics electronics 102 and a battery backup system 206 for a phone module 208 is shown, according to an exemplary embodiment. Vehicle 100 is shown to include a vehicle power system 210. Vehicle power system 210 may be the vehicle's primary power system (e.g., including the main battery for the vehicle, a twelve volt battery, the vehicle's charging system, the vehicle's alternator, a hybrid-electric power system, etc.). Under normal operating conditions, vehicle power system 210 provides operating power to telematics electronics 102. Vehicle power system 210 can directly or indirectly provide operating power to phone module 208 or battery backup system 206.

Referring now to FIGS. 2A and 2B, a flow chart of a process 250 for providing battery backup power to phone module 208 in vehicle 100 is shown, according to an exemplary embodiment. Process 250 includes operating phone module 208 using telematics electronics 102 (step 252). Operating phone module 208 can include providing data such as function calls, AT commands, data strings for a Hayes command set, data for transmission, audio signals, or other data communications from telematics electronics 102 to phone module 208. Phone module 208 can receive its operating power by way of a powered connection to telematics electronics 102 or, as shown, phone module 208 can receive its operating power from vehicle power system 210.

Process 250 is shown to include using backup circuit 212 of battery backup system 206 to determine that backup power for phone module 208 is needed (step 254). In one exemplary embodiment, backup circuit 212 can receive a power input from vehicle power system 210. In such an embodiment, backup circuit 212 can monitor the voltage or other conditions available from vehicle power system 210. For example, backup circuit 212 may monitor power available on the vehicle's primary power system 210 and determine that backup power is needed in response to a loss of power by vehicle power system 210. In another exemplary embodiment, backup circuit 212 is configured to monitor a signal from at least one of telematics electronics 102, a vehicle data bus, or an airbag system. Backup circuit 212 can determine that the backup power for phone module 208 from backup battery module 214 is needed in response to the received signal (e.g., received control signals, signals received via data communications from telematics electronics, etc.). The received signal may be or include at least one of a collision detect signal, an airbag deployment signal, or an automatic collision notification signal. In some embodiments, monitoring the signal may be or include detecting whether a normally received signal is no longer present. For example, telematics electronics 102 may be configured to normally provide backup circuit 212 with an automatic collision notification (ACN) signal. Backup circuit 212 may be configured to detect removal of the ACN signal.

In response to certain conditions that backup circuit 212 can detect while monitoring the conditions of vehicle power system 210, backup circuit 212 can provide power from backup battery module 214 to phone module 208 (step 256). The power provided from backup battery module 214 to phone module 208 can cause or allow phone module 208 to complete a transmission (step 258). The transmission can be or include any transmissions described above or below, including, for example, an emergency short message service (SMS) transmission.

Battery backup system 206 and backup circuit 212 provides the backup power to phone module 208 without providing operating power to vehicle telematics electronics 102. Backup battery module 214 may have a low voltage output such that phone module 208 can be operated with backup battery module 214 but vehicle telematics system 102 could not be operated with backup battery module 214. In an exemplary embodiment, backup battery module 214 has a terminal voltage of less than half that of a terminal voltage of vehicle power system 210. In the same or other exemplary embodiments, battery module 214 has a terminal voltage that is lower than that required to power-up and operate telematics electronics 102. In yet other embodiments, backup battery module 214 has a terminal voltage that is lower than that required to maintain operation of powered-up telematics electronics 102. In an exemplary embodiment, backup battery module 214 has a terminal voltage of about 3.0V to 4.0V. In another embodiment, backup battery module 214 has a terminal voltage of 3.8V to 4.0V. While in many embodiments of the present disclosure the voltage provided by backup battery module 214 is described as being lower than that of vehicle power system 210, in other embodiments the voltage may be the same, higher, stepped down, or otherwise configured. For example, the voltage provided by battery backup system 206 and backup battery module 214 to phone module 208 can be the same (or approximately the same) as the voltage provided by vehicle power system 210 or telematics electronics 102. In such embodiments, the capacity of backup battery module 214 may be sized to be just large enough to complete an emergency transmission by phone module 208. The capacity of backup battery module 214 may be sized to allow phone module 208 to make one transmission, may be sized to allow phone module 208 to attempt a plurality of transmissions, may be sized to allow phone module 208 to attempt and complete a plurality of transmissions, or may be sized to allow phone module 208 to continue a process of transmitting, waiting for an acknowledgement, and retrying a transmission for a period of time (e.g., thirty seconds, ten minutes, one hour, etc.).

The transmission of step 258 can be commanded by processing electronics of backup circuit 212 or commanded by a processing routine of phone module 208. For example, in some embodiments phone module 208 monitors a power interface with backup circuit 212 to determine whether to make the transmission. In other words, in some embodiments, when low voltage power is provided to an interface of phone module 208, processing logic of phone module 208 initiates and completes the transmission. In yet other embodiments, phone module 208 monitors an ACN signal or another control signal from backup circuit 212, telematics electronics 102 or another vehicle source to determine whether to initiate and complete the transmission. Power for the transmission is at least partially provided by backup battery module 214, if necessary. In some cases (e.g., where a collision occurs but vehicle power system 210 is not affected), power from vehicle power system 210 is used to power phone module 208 during the transmission. If power is determined to be needed (e.g., by backup circuit 212) then backup circuit 212 can provide the necessary power to phone module 208 for initiating, continuing, and/or completing the transmission.

While battery backup system 206 is shown to include backup battery module 214 and backup circuit 212 in FIG. 2A, in other embodiments a battery backup system for operating a phone module can include one or more of: the phone module, the telematics electronics, connectors therebetween, a battery charging system, one or more signal filters, one or more additional processing circuits, or other electronics components for completing the activities and processing described in the present application.

Figure 3A:
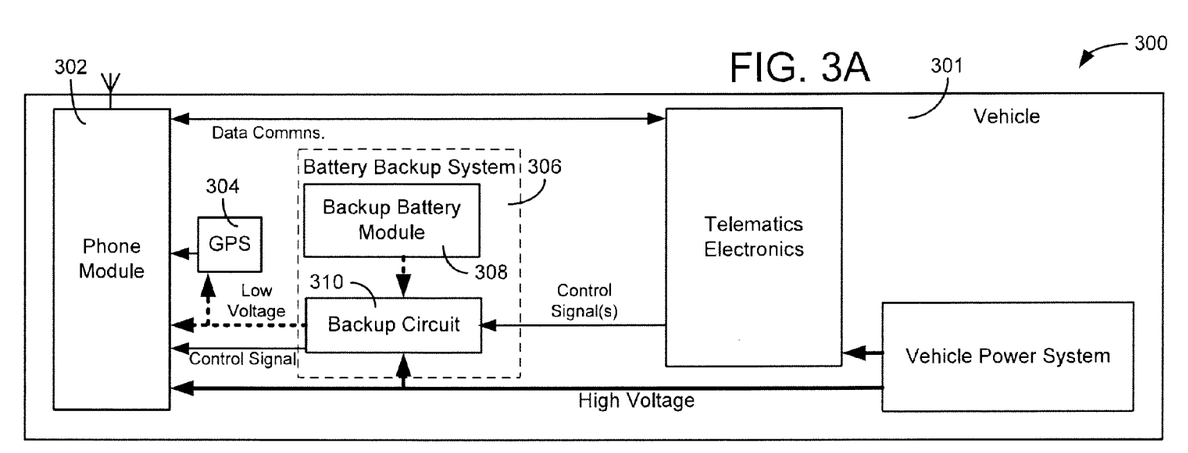
FIG. 3A is a block diagram of a system for providing backup power to a phone module in a vehicle, according to another exemplary embodiment.

Referring now to FIG. 3A, a system 300 is shown for providing backup power to a phone module 302 in a vehicle 301, according to another exemplary embodiment. System 300 is shown to include a GPS receiver 304. GPS receiver 304 is shown to receive power from battery backup system 306. For example, GPS receiver 304 can receive backup power from backup battery module 308 by way of backup circuit 310. Phone module 302 can use location information (e.g., GPS coordinates, LAT/LON coordinates, etc.) provided by GPS receiver 304 in making its transmission. For example, if phone module 302 transmits an SMS message to a remote source during an emergency, phone module 302 can be configured to transmit the received location information with a unique identifier for the vehicle or service subscriber (i.e., vehicle owner). In other embodiments, additional or alternative information may be transmitted by phone module 302 in an emergency situation.

Figure 3B:
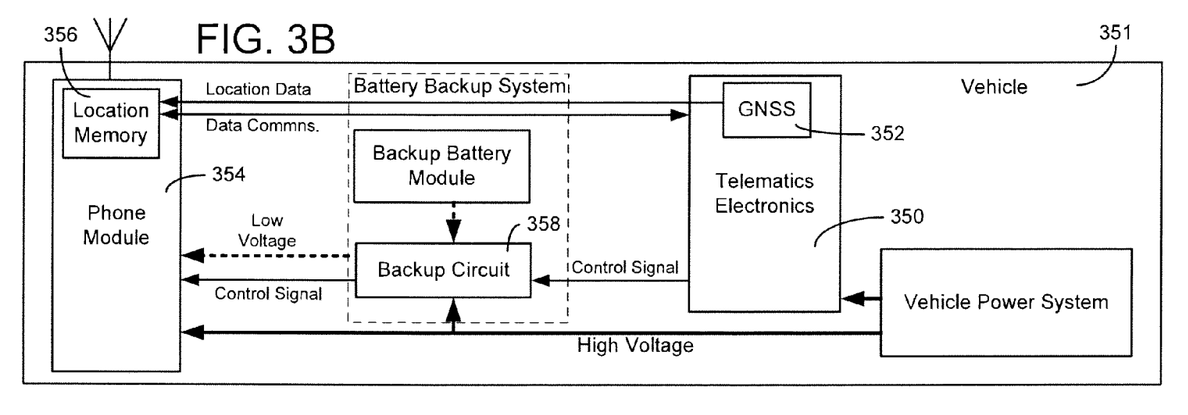
FIG. 3B is a block diagram of a system for providing backup power to a phone module in a vehicle, according to yet another exemplary embodiment.

In FIG. 3B, telematics electronics 350 is shown to include the global navigation satellite system (GNSS) 352 for the vehicle 351 as a part of telematics electronics 350, according to yet another exemplary embodiment. GNSS 352 may be the primary navigation receiver for vehicle 351 and normally provide telematics electronics 350 with location information for displaying maps or directions to a user (e.g., via the telematics system electronic display). GNSS 352 can periodically (e.g., once every fifteen seconds) provide location data to phone module 354. Phone module 354 may store the location data (e.g., a location history of a plurality of samples) in location memory 356. When phone module 354 determines that it should initiate a transmission in an emergency (e.g., when a control signal from backup circuit 358 changes, when low voltage power is received from backup circuit 358, etc.), phone module 354 (i.e., a processor thereof) can recall the location information stored in location memory 356 and prepare one or more packets, messages, or other information structures containing some or all of the location information stored in memory. It should be noted that while GPS is mentioned in this disclosure, in certain embodiments GPS may be replaced with another GNSS such as Galileo, GLONASS, the Beidou navigation system, the global Compass navigation system, or another suitable navigation or locationing system of the past, present or future.

Figure 4:
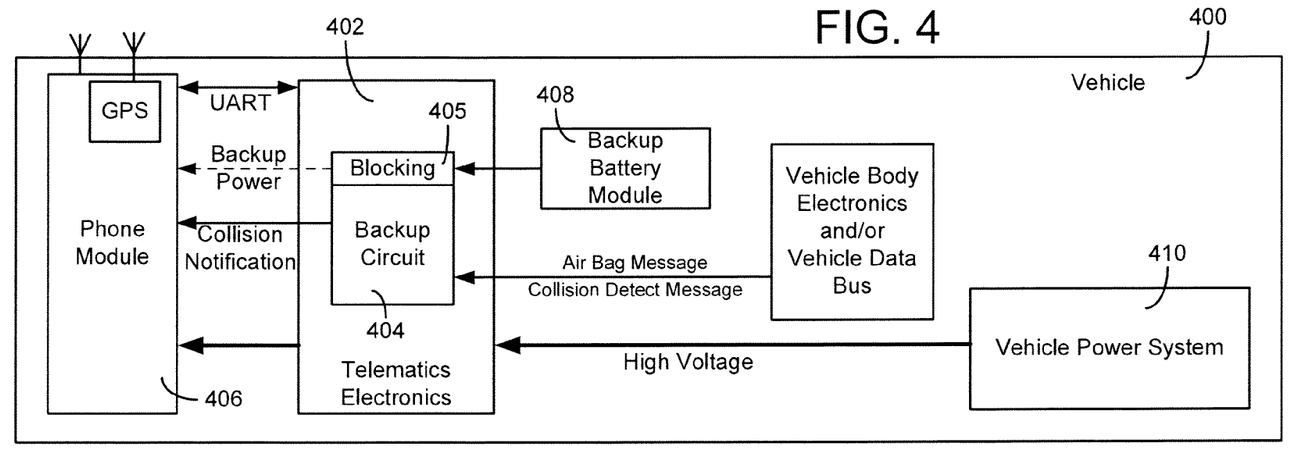
FIG. 4 is a block diagram of a vehicle containing telematics electronics and a backup circuit for a phone module, according to yet another exemplary embodiment.

Referring now to FIG. 4, a block diagram of a vehicle 400 containing telematics electronics 402 and a backup circuit 404 for a phone module 406 is shown, according to another exemplary embodiment. Telematics electronics 402 is shown to include a backup circuit 404. In the embodiment of FIG. 4, backup circuit 404 can be or include a software module of telematics electronics 402. A hardware current blocking module 405 is included on telematics electronics 402 for blocking current from flowing to phone module 406 from backup battery module 408 unless a backup event occurs. Blocking component 405 may be or include a hardware switch that restricts power from flowing from module 408 to phone module 406 while the switch receives power from vehicle power system 410.

Backup circuit 404 can receive air bag status messages or collision detect messages from vehicle body electronics (e.g., via a vehicle data bus, via a controller-area network (CAN), via an FCAN bus, via an OBD-II protocol, via an EOBD protocol, etc.). While the received or monitored messages are in normal states (e.g., are being received as false, are not being received at all, etc.), backup circuit 404 can continue providing a collision notification normally provided to phone module 406. For example, backup circuit 404 can enable the collision notification provided to phone module 406 whenever the ignition is turned on. Phone module 406 can include a software routine and/or hardware electronics that monitor the collision notification. If the collision notification line is removed (e.g., if a voltage is removed), phone module 406 can include logic for switching from vehicle power system 410 power to power from backup battery module 408. The logic of phone module 406 can also initiate and complete an SMS transmission or another emergency transmission (e.g., automated voice recorded transmission).

The phone modules or the battery backup systems described herein can include logic that determines when an emergency transmission should not be made based on various vehicle events. For example, in the embodiment of FIG. 4, backup circuit 404 can monitor the ignition status of the vehicle and notify phone module 406 when the vehicle is properly "OFF" (turned off in a controlled manner, turned off via turning the key, turned off via user button press, etc.). Based on tracking such notifications, logic of phone module 406 can determine whether or not to initiate a phone call or to use battery backup power when the collision notification is removed or another emergency event occurs. For example, if the vehicle is off when power suddenly becomes unavailable from the vehicle power system, it is likely that the user or a dealer has disconnected the battery for maintenance and the phone module's logic does not initiate an emergency transmission.

In normal operation, backup circuit 404 of telematics electronics 402 can monitor the primary or high voltage power from vehicle power system 410. If power from vehicle power system 410 is lost and the vehicle ignition was not turned off (e.g., not turned off via user command, etc.) or the power from vehicle power system 410 is lost and another event occurs (e.g., an airbag deployment, a collision sensor changing states, etc.), then the collision notification can be removed from application to phone module 406. Phone module 406 can then initiate an emergency transmission as described herein. In the embodiment shown in FIG. 4, phone module 406 can normally (e.g., when telematics electronics is powered and operating) communicate with the telematics electronics via a universal asynchronous receiver/transmitter (UART) or another communications interface.

Figure 5A:
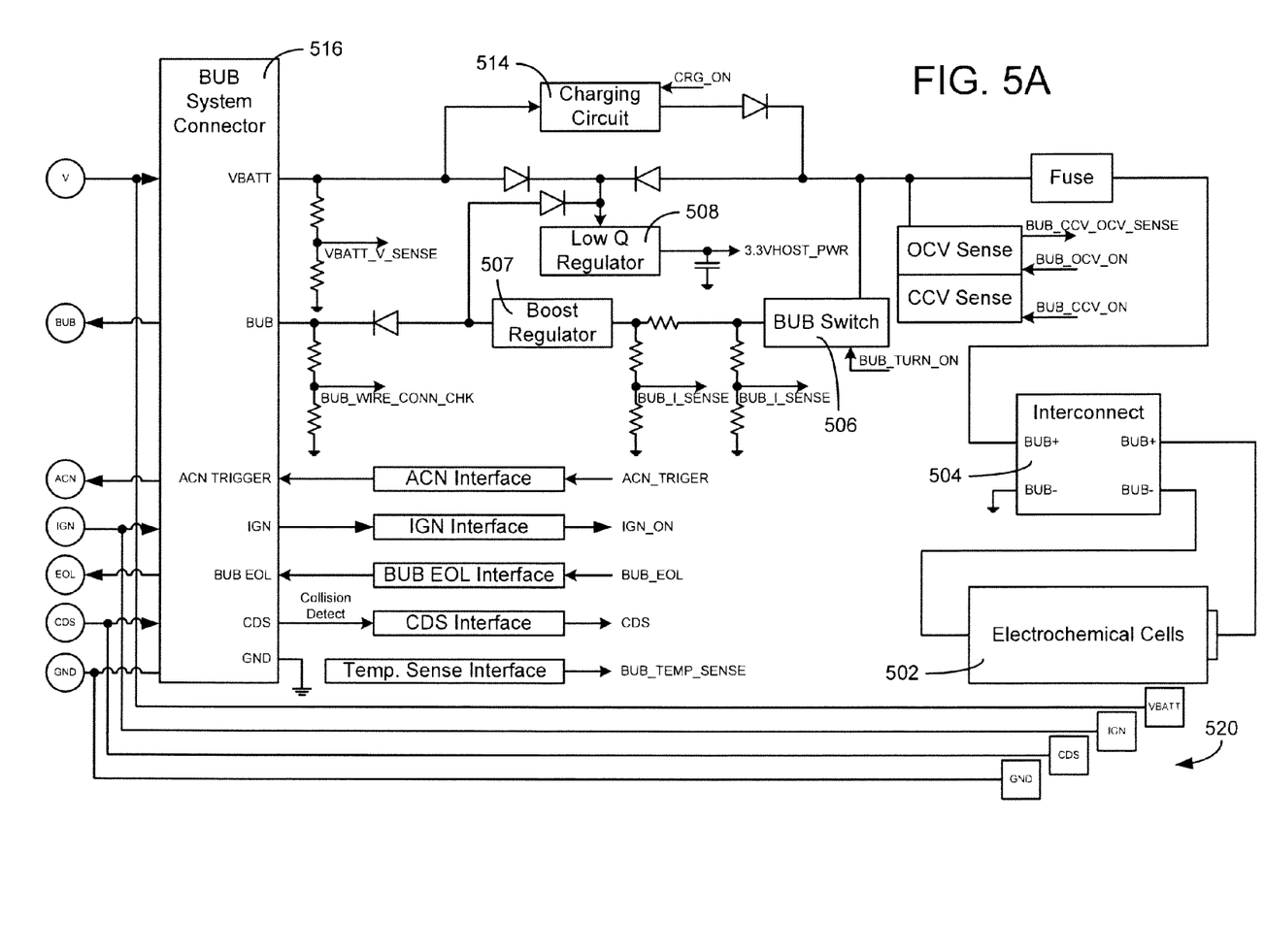
FIGS. 5A-5C illustrate a detailed diagram of a circuit for providing backup power to a phone module in a vehicle with telematics electronics, according to an exemplary embodiment.
Figure 5B:
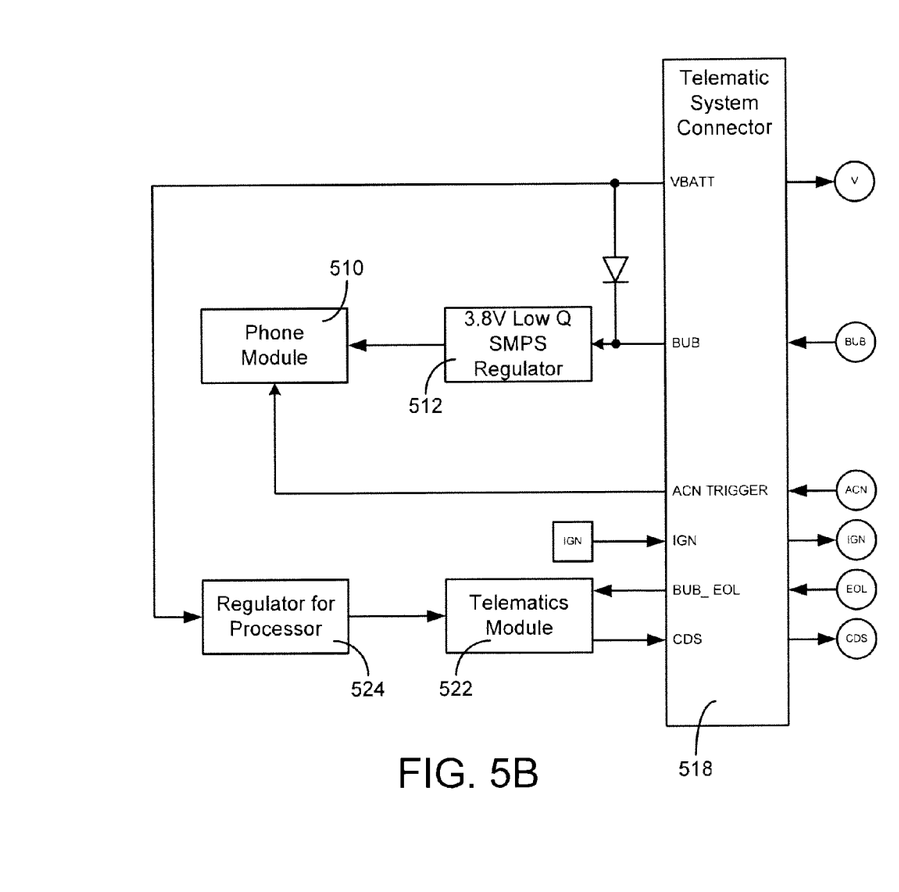
Figure 5C:
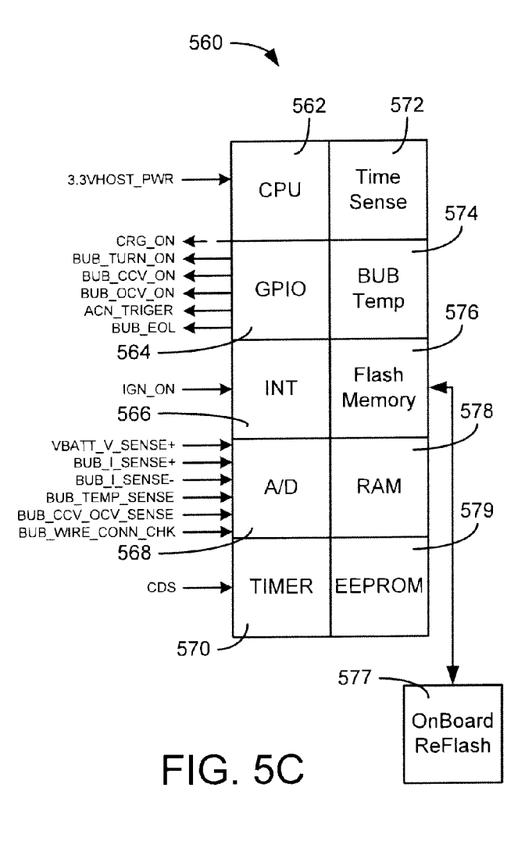

FIGS. 5A-5C illustrate a detailed diagram of a circuit for providing backup power to a phone module in a vehicle with telematics electronics, according to an exemplary embodiment. FIG. 5A illustrates the right side of the circuit diagram of FIGS. 5A-5C. FIG. 5B illustrates the left side of the circuit diagram of FIGS. 5A-5C. FIG. 5C illustrates a battery backup processing circuit for connection to a plurality of inputs and outputs of the circuit diagram portions shown in FIGS. 5A and 5B.

FIG. 5A is shown to include one or more electrochemical cells 502 that are configured to serve as the backup battery or backup battery module described above (e.g., module 214 shown in FIG. 2A). Electrochemical cells 502 can include a plurality of cells arranged in series, arranged in parallel, or otherwise arranged to provide the desired terminal voltage of the combined battery. Interconnect 504 is a terminal, port or other interface for connecting electrochemical cells 502 to the system such that power can be received. A fuse is shown to protect the circuit and/or electrochemical cells 502 in the event of an over-current condition. One or more open circuit voltage (OCV) sensors or closed circuit voltage (CCV) sensors can be provided in the circuit for outputting voltage conditions (e.g., of the backup battery electrochemical cells 502) to a backup circuit processor, telematics electronics, or another component of the system.

Backup battery (BUB) switch 506 can receive a BUB_TURN_ON input from processor 560 shown in FIG. 5C and respond to such an input by switching to providing power from electrochemical cells 502 to boost regulator 507 and eventually to phone module 510 shown in FIG. 5B. A low quiescent (Low Q) regulator 508 can provide a small output voltage (e.g., 3.3VHOST_PWR) to processor 560 shown in FIG. 5C (e.g., so that processor 560 can operate). Power can be provided through regulator 508 to processor 560 from either electrochemical cells 502 or from the vehicle's battery via the "VBATT" input. Boost regulator 507 can step up or otherwise boost or convert the voltage for providing to phone module 510 from battery 502. The power provided to phone module 510 is shown as being first provided to 3.8V Low Q SMPS (i.e., switched mode power supply) regulator 512 for providing a linear/constant output voltage (e.g., 3.8V) to phone module 510. Although regulator 512 is shown as being a 3.8V Low Q SMPS regulator, other types of regulators appropriate for varying types of phone modules may be used in other embodiments.

FIG. 5A is further shown to include a charging circuit 514 that can cause charging power to be provided from the vehicle's power system (e.g., via VBATT) to electrochemical cells 502. Charging circuit 514 can be turned on by a control signal CRG_ON from processor 560. Processor 560 can decide to turn charging circuit 514 on based on any number or combination of factors or inputs (e.g., BUB_CCV_OCV_SENSE, an idle state of the vehicle, a vehicle battery voltage level (VBATT_V_SENSE), a battery backup temperature level (BUB_TEMP_a battery backup wire connection check (BUB_WIRE_CONN_CHK), etc.).

FIGS. 5A and 5B are shown to include backup battery system connector 516 and telematic system connector 518. Connectors 516, 518 may be wire terminals, jacks, standardized communications or power interfaces, a combination thereof, or another type of connector for connecting data or power lines to varying sources and destinations.

Data or power sources 520 from vehicle body electronics (e.g., a collision detect signal (CDS) from an airbag circuit), the vehicle power system (e.g., providing the illustrated VBATT power source), the vehicle data bus (e.g., providing an ignition status IGN), the engine control unit (ECU) or other vehicle sources can be provided to BUB system connector 516, telematic system connector 518 or connected directly to components of the system in FIGS. 5A-5C (e.g., processor 560, etc.).

Power from the vehicle's power system via VBATT can normally power telematics module 522 via regulator 524. Telematics module 522 can receive a backup battery end-of-life signal (i.e., BUB_EOL) from processor 560. Processor 560 can determine a backup battery end of life based on time in use, state of charge information, a battery health diagnostics process, or via other methods or information. Telematics module 522 can notify a vehicle owner (e.g., via graphical user interface notification, via a text-to-speech output) when the backup battery should be changed in response to a changed end-of-life signal. Telematics module 522 may be configured to monitor received power from regulator 524 to determine whether to affect the CDS provided to processor 560. Processor 560 can receive the CDS to determine whether or when to cause the backup battery to be used (e.g., via switch 506). When processor 560 determines that the backup battery should be used, processor 560 can output an ACN_TRIGGER signal for reception by phone module 510. Phone module 510 can respond to the received trigger signal by making an emergency transmission, as described above.

Processor 560 is shown to include a central processing unit (CPU) 562. CPU 562 can be a general purpose process, a specific purpose processor, a field programmable gate array (FPGA), or a processor optimized for executing computer instructions stored in memory (e.g., EEPROM). CPU 562 can serve as the master controller for the rest of the components of processor 560. While the components of processor 560 are shown as integrated, the components of the backup circuit's processing circuit can be distributed in varying ways. For example, timer 570 may be an off-processor or off-board component. Outputs can be provided from processor 560 via general purpose input/output (GPIO) 564. Inputs can be received from other sources via analog to digital (A/D) converter 568. Interface 566 can monitor an ignition signal (e.g., so that computer instructions of processor 560 can determine whether to issue an ACN_TRIGGER to phone module 510). The CDS is shown as received by timer 570 which can operate to ensure that a CDS change is not spurious or errant. For example, the timer can ensure that the CDS changes and remains changed for a period of time (e.g., 5 seconds) before providing the signal on to CPU 562 so that ACN_TRIGGER can be generated. Timer 570 can operate in conjunction with time sense 572. For example, timer 570 can serve as the clock for CPU 562 and can be used by time sense 572 for determining whether certain time thresholds are met. BUB temp 574 can be a battery backup temperature sensor which may process BUB_TEMP_SENSE or complement BUB_TEMP_SENSE by providing another temperature measurement. Flash memory 576 can store a vehicle VIN or other identifier, location information, computer instructions, threshold information, timing information, or other information that may be used by processor 560 to complete the activities described herein. RAM 578 can be used as volatile or temporary storage (e.g., for received location information from a GNSS), for storing values for the inputs received at A/D 568, for storing temporary computer instructions. EEPROM 579 can store computer instructions for execution by CPU 562, identifying information for processor 560, preset thresholds, or other information appropriate for non-volatile memory. Onboard reflash module 577 can operate to provide upgradeability or customizability to processor 560 (e.g., by allowing a user or service technician to change the logic for processor 560 stored in flash memory 576 and/or EEPROM 579.

Varying embodiments described above provide for a low voltage backup battery to power a telematics stack (e.g., vehicle navigation system, media system, hands-free phone system, etc.). The voltage of the backup battery may typically be around 3.0VDC to 4.0VDC and for powering a vehicle phone module (e.g., a cellular phone module, CDMA phone module, GSM phone module, embedded phone module, etc.) directly. In the event that the main vehicle battery and/or connection to the telematics unit has been compromised or is no longer available, the backup battery can power the phone for an emergency transmission. The backup battery can be sized to adequately power the phone module and a small backup circuit (e.g., small microprocessor) long enough to complete an airbag or emergency call. The microprocessor can normally execute small requirements checks or data tracking activities (e.g., conduct diagnostics of the battery, conduct airbag signal diagnostics, log location information, communicate with the telematics electronics, etc.) and command the phone to make a call in a detected or estimated emergency situation.

In an alternative embodiment, the backup circuit can also support a stolen vehicle tracking system (e.g., provide power to a stolen vehicle tracking system) by reserving the backup power until the stolen vehicle is stopped and the main battery is disconnected. Therefore, when the thief disconnects the main battery, a backup circuit as described herein can maintain power to a phone module so that the phone module can transmit a location to the authorities or another destination. A message received from a remote source can enable such a process in the phone module or the backup circuit. For example, data communications received by the phone module indicating that the vehicle has been stolen can be interpreted and used to trigger a process wherein the next time the vehicle battery power is disconnected, the phone module will be powered by the backup power and caused to transmit the location of the stolen vehicle.

In yet other alternative embodiments, the event that triggers the phone call may be automatic or user-initiated. Many of the embodiments described herein relate to an automatic phone transmission wherein an emergency signal or event causes automated transmission of an emergency message. In some alternative embodiments, the phone transmission may be initiated via a button press, voice command, or other user-initiation. For example, even if the vehicle's power system is drained or otherwise disabled, a button may be provided that provides a signal to the backup circuitry and/or phone module that, when triggered, causes the phone module to use a small amount of power in the backup battery to make an on-demand phone transmission (e.g., including vehicle location, etc.).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A battery backup system for use with vehicle telematics electronics, comprising:
   a phone module configured for operation by the vehicle telematics electronics;
   a battery module configured to provide power to the phone module; and
   a circuit configured to determine that backup power is needed and to cause the battery module to provide the backup power to the phone module for initiating a transmission via the phone module without providing operating power to the vehicle telematics electronics,
   wherein the battery module provides a low voltage output that meets a minimum power requirement of the phone module and does not meet a minimum power requirement of the vehicle telematics electronics,
   and wherein the circuit determines that backup power is needed in response to:
     (a) a determination of a loss of primary power, and
     (b) at least one of a collision detect signal, an airbag deployment signal, or an automatic collision notification signal.

2. The battery backup system of claim 1, wherein the phone module comprises a processing circuit configured to initiate the transmission and to complete the transmission using the backup power received from the battery module.

3. The battery backup system of claim 2, wherein the phone module is configured to initiate the transmission without user input or user action.

4. The battery backup system of claim 2, wherein the transmission is at least one of: an emergency call, an emergency text message, an emergency data message, or an emergency email.

5. The battery backup system of claim 1, wherein the circuit is configured to monitor power available on the vehicle's primary power system and to determine that backup power is needed in response to a loss of power available on the vehicle's primary power system.

6. The battery backup system of claim 1, wherein the circuit is configured to monitor a signal from at least one of the telematics electronics, a vehicle data bus, or an airbag system and to determine that the backup power is needed in response to the received signal.

7. The battery backup system of claim 6, wherein the signal is at least one of a collision detect signal, an airbag deployment signal, or an automatic collision notification signal.

8. The battery backup system of claim 7, wherein monitoring the signal comprises detecting whether the signal is no longer present.

9. The battery backup system of claim 1, wherein the low voltage output of the battery module is less than half of a voltage output of the vehicle power system.

10. The battery backup system of claim 1 further comprising:
    a location system for determining a location of a vehicle, wherein the location system is configured to provide location data to the phone module,
    wherein the phone module is configured to periodically store the location data from the location system in a location memory of the phone module, and
    wherein the phone module is further configured to include the location data in the transmission when the circuit determines that backup power is needed.

11. A method for providing battery backup power to a phone module in a vehicle having telematics electronics that are normally powered by a vehicle power system, comprising:
    determining that an ignition status is on;
    determining that backup power is needed at a backup circuit; and
    using the backup circuit to cause a battery backup module to provide backup power to the phone module for initiating a transmission via the phone module based on the determination that the ignition status is on and that backup power is needed at the backup circuit without providing operating power to the vehicle telematics electronics,
    wherein determining that backup power is needed includes:
      (a) determining a loss of primary power, and
      (b) determining that at least one of a collision detect signal, an airbag deployment signal, or an automatic collision notification signal has been received.

12. The method of claim 11, further comprising:
    using a processing circuit of the phone module to initiate the transmission and to complete the transmission using the backup power received from the battery backup module.

13. The method of claim 12, wherein the initiation of the transmission occurs without user input or user action.

14. The method of claim 13, wherein the transmission is at least one of: an emergency call, an emergency text message, an emergency data message, or an emergency e-mail.

15. The method of claim 11, further comprising:
    monitoring power available on the vehicle power system,
    wherein determining that backup power is needed at the backup system occurs in response to a loss of power available on the vehicle power system.

16. The method of claim 11, further comprising:
    monitoring a signal from at least one of the telematics electronics, a vehicle data bus, or an airbag system;
    wherein determining that backup power is needed occurs in response to the monitored signal.

17. The method of claim 16, wherein the signal is at least one of a collision detect signal, an airbag deployment signal, or an automatic collision notification signal;
- wherein the battery module has a terminal voltage of less than half that of a default terminal voltage of the vehicle power system;
- wherein the batter module has a terminal voltage that is lower than that required to power-up and operate the telematics electronics.

18. The method of claim 11 further comprising:
- determining a location of the vehicle with a location system; and
- storing, periodically, the location in a location memory of the phone module.

19. A battery backup system for use with vehicle telematics electronics, comprising:
- a phone module configured for operation by the vehicle telematics electronics;
- a battery module configured to provide power to the phone module;
- a location system for determining a location of a vehicle, wherein the location system is configured to provide location data to the phone module;
- a circuit configured to determine that backup power is needed; and
- means for causing the battery module to provide backup power to the phone module in response to the determination that backup power is needed, the backup power for providing operating power to the phone module without providing operating power to the vehicle telematics electronics,
- wherein the phone module is configured to periodically store the location data from the location system in a location memory of the phone module,
- and wherein the circuit determines that backup power is needed in response to:
  (a) a determination of a loss of primary power, and
  (b) at least one of a collision detect signal, an airbag deployment signal, or an automatic collision notification signal.

20. The battery backup system of claim 19, wherein the battery module provides a low voltage output such that the phone module can be operated with the battery module but the vehicle telematics system cannot be operated with the battery module;
- wherein the phone module comprises a processing circuit configured to initiate the transmission and to complete the transmission using the backup power received from the battery module; and
- wherein the phone module is configured to initiate the transmission without user input or user action.

* * * * *